May 30, 1933.　　　　S. E. GARBER　　　　1,911,892

SHARPENING ATTACHMENT FOR LAWN MOWERS

Filed May 13, 1932

Inventor
Samuel E. Garber

By ____
Attorney

Patented May 30, 1933

1,911,892

UNITED STATES PATENT OFFICE

SAMUEL E. GARBER, OF BRIDGEWATER, VIRGINIA

SHARPENING ATTACHMENT FOR LAWN MOWERS

Application filed May 13, 1932. Serial No. 611,178.

This invention relates to an improvement in attachments for sharpening the cutting knives of lawn mower reels.

One of the objects of the invention is to provide an attachment which can be readily and quickly placed in position on any standard type of lawn mower, and which can be quickly removed, if desired.

A further object of the invention is to provide a construction which permits of a simple and positive adjustment of the sharpening element so as to obtain a greater or less sharpening of the knives, as desired, or, on the other hand, to remove the sharpening element out of the path of the knives when not in use, without removing the attachment from the mower.

With the above and various other objects in view which will become more fully apparent as the nature of the invention is better understood, the same consists in the novel combination and arrangement of features as will be hereinafter more fully described, illustrated in the accompanying drawing and defined in the appended claims.

A preferred and practical embodiment of the invention is shown in the accompanying drawing, in which:—

Similar reference characters designate corresponding parts throughout the several figures of the drawing.

Figure 1:
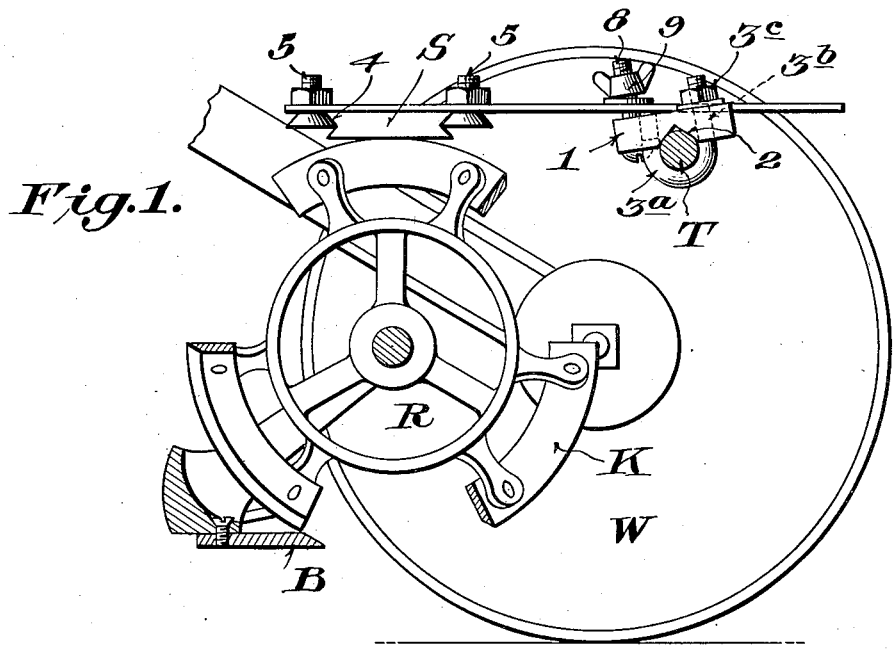
Figure 1 is a cross sectional view of a lawn mower illustrating the application of the invention.

As previously indicated the present attachment may be applied to any standard type of lawn mower which includes the usual wheels W and the cutting knives K of the reel R which cooperate with the fixed blade B in the usual manner. In Figure 1, T indicates a tie rod or cross bar which usually connects opposite wheel frames, and it is on this rod that it is proposed to mount the present novel attachment.

Figure 2:
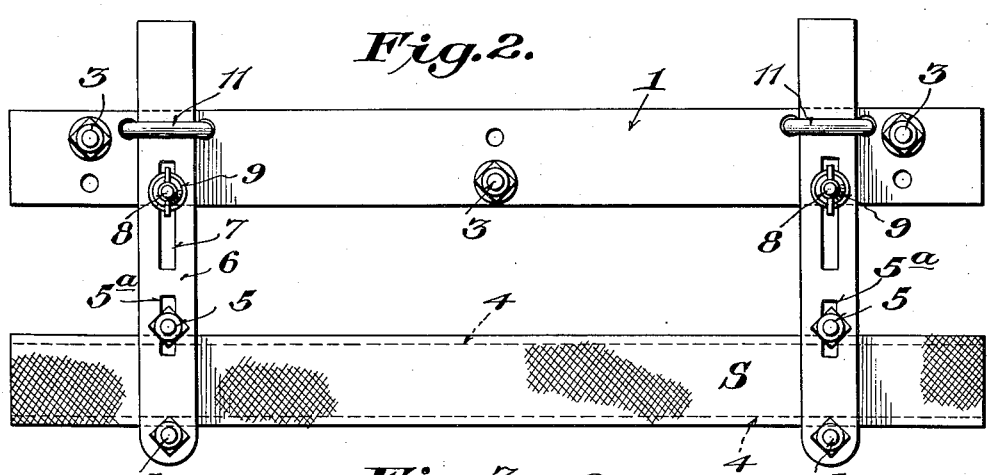
Figure 2 is a top plan view of the attachment.

According to the embodiment of the invention shown in the drawing, the same includes in its organization an attachment bar 1 which is provided at its underside with a channel or groove 2 which forms in effect a socket for receiving the tie rod T. This supporting bar is preferably secured to the rod by means of the fastenings 3 which are intended to be quickly detachable because of the fact that they are of hook or J-shaped formation, as distinguished from U-shaped formation, which permits of the fastenings being loosened without being removed from the bar to effect application and disengagement of the bar from the rod T. That is to say, the fastenings 3 comprise a hook portion $3^a$ and a shank portion $3^b$ which passes through the bar 1 to receive the clamping nut $3^c$. By loosening or tightening the nuts $3^c$, it will be apparent that the fastenings may be removed or set in position. Any number of fastenings 3 may be employed at either side of the bar 1, but as shown in Fig. 2, three fastenings have proved to be adequate in actual practice.

Figure 3:
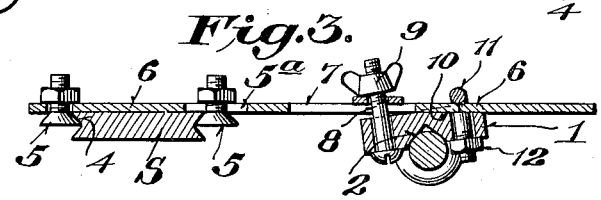
Figure 3 is a transverse vertical sectional view.
Figure 4:
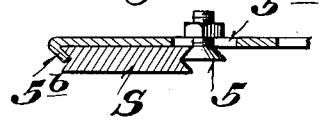
Figure 4 is a detail view illustrating a modified way of mounting the sharpening element.

One of the distinctive features of the invention is to provide a yielding mounting for the sharpening element S which is preferably in the form of a flat metallic file of relatively fine grain. As shown, this element may be provided with side grooves or channels 4 which cooperate with the fastenings or abutments 5—5 carried by the arms 6. One of the abutments may be fixed as shown in Figure 3 and the other may be adjustable in the slot $5^a$. However, when using files of the same size it will be apparent that the same may be placed between the abutments by sliding the same between them. Figure 4 of the drawing illustrates a modified form of fixed abutment $5^b$, the same being formed by bending down one end of the arm 6 which carries the fastenings.

The arms 6 are preferably made of spring metal and are also slotted as indicated at 7 to receive a tensioning bolt 8 which carries a wing nut 9. The end of each arm 6 beyond the slot 7 is adapted to bear on the beveled surface or inclined seat 10 of the supporting bar 1, as clearly shown in Figures 1 and 3, the said beveled surface being located at one side of the longitudinal center of the bar. Therefore, it will be apparent that by manipulating the wing nut 9, the arm 6 may be moved upwardly or downwardly to bring the sharpening element S into and out of engagement with the knives K. If more or less sharpening is desired, the wing nut may be turned so as to press the arm 6 downwardly, or on the other hand if it is desired to operate the mower without sharpening the knives, the nut 9 may be moved upwardly on the shank of the bolt 8 to permit the sharpening element S to swing upwardly out of the path of the knives.

The arms 6—6 are clamped against the inclined seat or beveled surface 10 of the bar 1 by the inverted U-shaped fastenings 11 which are provided with nuts 12 arranged at the underside of the bar 1. As shown in Figures 2 and 3 it will be apparent that the arms 6 are rigidly clamped to the bar so as to prevent twisting or shifting thereof on the bar. By loosening the nuts 12 of the fastenings 11 it will be apparent that the arms 6—6 can be shifted with reference to the bar, thereby properly to locate the sharpening element S with reference to the crown of the knives K.

With reference to the sharpening element S it may be pointed out that the same may be reversed, side for side to utilize both of the sharpening faces thereof, as desired. In other words, it is proposed to use a double faced flat file which provides an extensive sharpening surface which materially increases the life and usefulness of the entire attachment.

It will of course be understood that various changes in design may be resorted to within the scope of the appended claims, without departing from the spirit of the invention nor sacrificing any of its advantages.

I claim:—

1. A sharpening attachment for lawn mowers including an attaching bar having a flat upper face and a longitudinal tie-rod receiving recess on its underside, transversely beveled faces on the upper side of the bar located to one side of the longitudinal center of the bar, means carried by the bar for fastening the same to the tie rod of a lawn mower, spring arms adapted to be fitted to said beveled portions of the attaching bar, means for securing said arms to the bar and permitting their adjustment transversely thereof, means carried by the bar at a point opposite the bevelled faces for flexing the arms with reference to the bar, and a sharpening element carried by the ends of said arms remote from the attaching bar.

2. A sharpening attachment for lawn mowers including an attaching bar having a tie rod receiving recess on its under face, hook type fastenings carried by the bar for securing the same to the tie rod, transversely beveled seats formed in the upper face of the bar, spring arms mounted on said seats and having slots therein, tensioning elements carried by the bar adjacent said seats and projecting through the slots in the arms, and a sharpening element carried by the ends of the arms remote from the attaching bar.

3. A sharpening attachment for lawn mowers including an attaching bar having its upper surface provided with a transversely inclined seat extending partially across said surface, an arm mounted in said seat so as to be angularly disposed with reference to the plane of the upper surface of the bar, a sharpening element carried by said arm, and means carried by the attaching bar at the side opposite said inclined seat for flexing the supporting arm thereby to vary the position of the sharpening element with reference to the attaching bar.

In testimony whereof I hereunto affix my signature.

SAMUEL E. GARBER.